Dec. 2, 1941.   A. J. ROCHOW   2,264,407
CULINARY IMPLEMENT
Filed Oct. 9, 1940
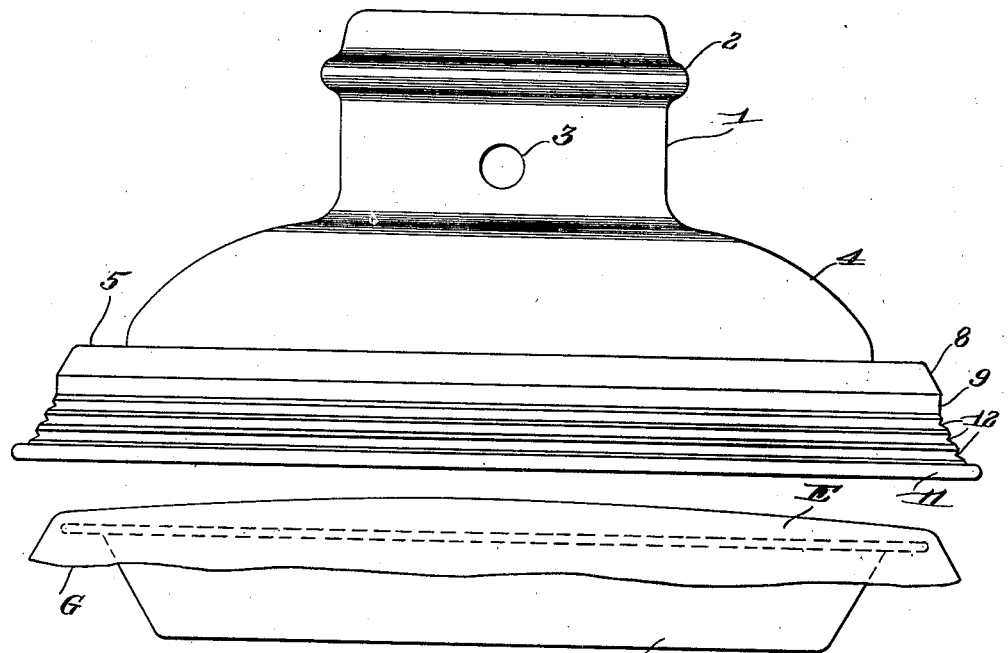
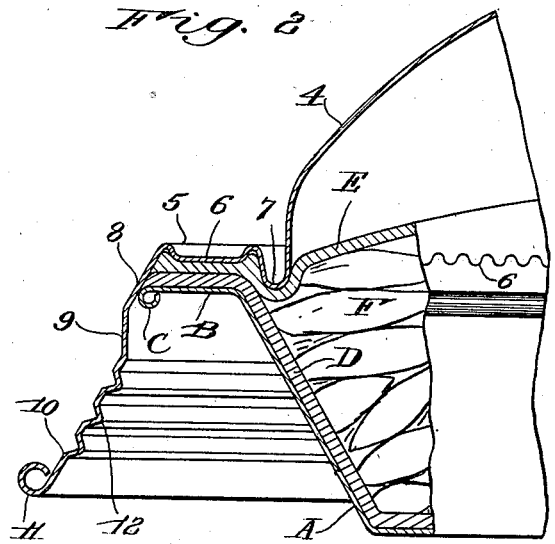
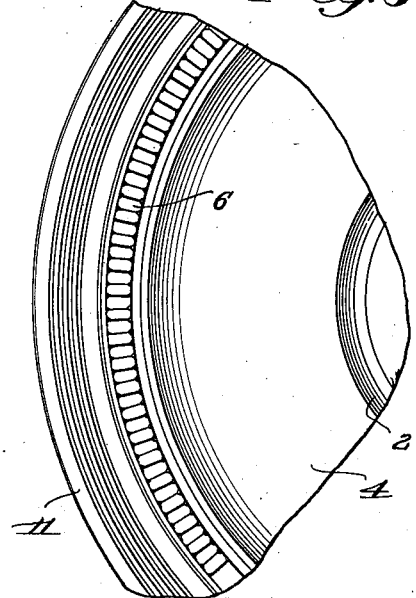
INVENTOR.
Arthur J. Rochow
BY
his ATTORNEY.

Patented Dec. 2, 1941

2,264,407

UNITED STATES PATENT OFFICE 2,264,407

CULINARY IMPLEMENT

Arthur J. Rochow, Pittsford, N. Y.

Application October 9, 1940, Serial No. 360,467

2 Claims. (Cl. 107—49)

My present invention relates to the culinary art and more particularly to the preparation of pies for baking, especially when the pie consists of upper and lower crusts although it is also applicable, in a way, to so called "open pies." It is common knowledge that in such instances a sheet of dough for the under crust, roughly shaped to the approximate size, is laid in the pie plate and pressed down to conform thereto with the ragged margins extending beyond the rim of the plate. The filling is added and then another dough sheet of the same approximate proportions is laid over in superposed direct contact with the lower sheet on the said rim. At this point the dough sheets are pressed firmly together all the way around either with a fork or with the fingers so that they will adhere to one another and provide a seal preventing the juices from escaping laterally as the filler boils during baking. Finally, the rough edges of the dough sheets are trimmed off neatly with a knife close to the edge of the rim of the container plate and the pie is ready for baking. All of which well known practice is here traversed to emphasize the utility of my improvements.

The object of the present invention is to provide a simple, inexpensive and efficient implement, particularly useful in bakeries where great numbers of pies are being prepared, that will function rapidly to concomitantly perform these functions of sealing and trimming the pie in a single, quick operation.

To these and other ends, the invention resides in certain improvements and combination of parts, all as will be hereinafter more fully described, the novel features being pointed out in the claims at the end of this specification.

In the drawing:

Figure 1 is a collective view in side elevation of an implement constructed in accordance with and illustrating one embodiment of my invention, shown in operative relationship with a pie plate and pie that is about to be trimmed and sealed;

Figure 2 is an enlarged, fragmentary, central, vertical section, and

Figure 3 is a fragmentary top plan view of the implement.

Similar reference numerals throughout the several views indicate the same parts.

Referring first to Figures 1 and 2, A indicates a pie plate, B the flat annular rim thereof having the beaded edge C, D the lower crust or dough sheet, E the upper crust or dough sheet and F the filler. The pie is assembled, as shown in Figure 1 where G indicates the ragged edges of the dough before trimming.

In the practice of my invention I prefer to spin from aluminum, or a similar metal plate, the generally circular and partially cylindrical implement as an integral structure. It embodies a central dome 1 of convenient size to be clasped by the hand in the manner of a knob, for which reason it is provided with a circumferential rib 2 to provide a better grip, there being also provided therein a vent 3. From thence the metal proceeds in a curve outwardly and downwardly to constitute a body portion 4. At the base of the body portion it proceeds outwardly, horizontally to provide an annular die 5. This die portion has stamped therein small radial ridges and depressions 6 which, on the underside, produce the same effect in the manner of a toothed annulus. Between the die and the body portion 4 is a depression 7 constituting an annular ridge on the underside.

Beyond the die the metal extends downwardly to produce an outwardly flared flange 8, thence vertically downwardly at 9 and is finally flared again outwardly and downwardly at 10 to terminate in a bead 11. The flat portion 10 is provided with circumferential corrugations 12 that produce a plurality of inwardly projecting ridges.

The mean diameter of the flange 8 is about that of the pie plate.

When, as in Figure 1, the implement is brought down upon the roughly assembled pie in the pie plate, the following actions and functions occur:

First the flare 10 roughly centers the implement with reference to the pie—at least the user can get the feel of the pie beneath his hand. At the same time the corrugations 12 tend to stretch and drape the rough edges of the dough sheet downwardly, closely, all around. The vertical portion 9, next above, more definitely centers the implement with reference to the bead C of the pie plate as the downward movement proceeds. Finally, the flange 8 presses through the dough to actually meet the bead of the plate, as in Figure 2, shearing it off neatly all around with one operation.

In the meantime, or concomitantly therewith, the die portion 5 presses the dough sheets D and E together intimately to form the marginal crust portion and this action of joining the two is intensified by the radial die ridges 6 which produce a homogeneous junction of the two dough bodies and at the same time give the desired pleasing decorative appearance to the crust. Also the rib 7 engages just inside of the rim B of the pie plate and forces the upper dough E against the lower dough D at the shoulder thereof. This not only further improves the appearance of the finished pie, but it fortifies the sealing of the upper and lower crusts against the lateral escape of the juices from the filler F. The effectiveness of these two pressures at 6 and 7 for this purpose is clearly ascertained from an inspection of Figure 2.

When the implement is lifted off again the pie is complete, tightly sealed at its edges and of pleasing appearance. Thus, with a row of prepared pies the operator may go down the line and with one stroke of the implement for each rapidly trim and seal all.

I claim as my invention:

1. An article of manufacture for culinary use in the formation of pies for baking embodying a central supporting and manipulating handle carrying an annular die adapted to engage over and in reaction with the flat rim of a pie plate and to thereby press together upper and lower dough crusts superposed in sheets on such rim, said die being provided, as a continuation of its outer edge, with a downwardly extending and outwardly flared flange portion adapted to act as a shear in connection with the edge of the rim of the pie plate to trim off the excess dough symmetrically with reference to the perimeter of the plate, and there being also provided on the flange as a further extension thereof a circumferentially corrugated further outwardly flared skirt adapted to serve as a centering means and as a preliminary positioning means for the rough dough margins.

2. An article of manufacture for culinary use in the formation of pies for baking consisting of a generally bell-shaped spun sheet metal plate embodying a central cylindrical dome adapted to serve as a hand grip and having a circumferential rib, a radially and downwardly extending intermediate body, an annular die portion thereon adapted to engage over and in reaction with the flat rim of a pie plate and to thereby press together upper and lower dough crusts superposed in sheets on such rim, said die being provided, as a continuation of its outer edge, with a downwardly extending and outwardly flared flange portion adapted to act as a shear in connection with the edge of the rim of the pie plate to trim off the excess dough symmetrically with the perimeter of the plate.

ARTHUR J. ROCHOW.